United States Patent [19]

Lynch et al.

[11] 4,182,817

[45] Jan. 8, 1980

[54] STEREOSPECIFIC OLEFIN POLYMERIZATION PROCESSES

[75] Inventors: Thomas J. Lynch, Houston; Robert J. Rowatt, Orange, both of Tex.

[73] Assignee: Gulf Oil Corporation, Pittsburgh, Pa.

[21] Appl. No.: 907,446

[22] Filed: May 19, 1978

Related U.S. Application Data

[63] Continuation-in-part of Ser. No. 835,270, Sep. 21, 1977, abandoned.

[51] Int. Cl.$^2$ .......................... C08F 4/02; C08F 10/02
[52] U.S. Cl. ................................. 526/169; 252/429 B; 526/106; 526/142; 526/159; 526/169.2; 526/352; 526/903
[58] Field of Search ............... 106/271, 272; 252/426, 252/429 A, 430; 260/42.14, 610 R; 526/1, 64, 86, 88, 106, 130, 159, 169, 169.2, 227, 352.2, 901, 903, 919, 352, 348, 142

[56] References Cited

U.S. PATENT DOCUMENTS

| | | | |
|---|---|---|---|
| 2,967,834 | 1/1961 | Daniel et al. | 526/903 |
| 3,061,601 | 10/1962 | Watt | 526/901 |
| 3,361,681 | 1/1968 | Muller | 526/903 |
| 3,849,334 | 11/1974 | Frielingsdorf et al. | 526/903 |
| 3,884,857 | 5/1975 | Ballard et al. | 526/227 |

*Primary Examiner*—Edward J. Smith
*Attorney, Agent, or Firm*—Richard L. Kelly

[57] ABSTRACT

A process is provided for the stereospecific polymerization of an olefin such as ethylene in a liquid medium in which a finely-divided solid polymerization catalyst is fed to the polymerization zone on a truly continuous basis to provide a uniform dispersion of the polymerization catalyst throughout the polymerization zone. The process is carried out by pumping into the polymerization zone a Bingham fluid which has the finely-divided solid polymerization catalyst uniformly dispersed throughout a solid continuous phase, which is a mixture of a wax and a liquid hydrocarbon.

9 Claims, 3 Drawing Figures

STEREOSPECIFIC OLEFIN POLYMERIZATION PROCESSES

This application is a continuation-in-part of our copending application Ser. No. 835,270, filed Sept. 21, 1977, now abandoned.

CROSS REFERENCE TO RELATED APPLICATIONS

Our copending application Ser. No. 907,445 filed May 19, 1978, discloses the Bingham fluid compositions employed in the process of this invention. This application and the present application are assigned to a common assignee.

BACKGROUND OF THE INVENTION

In certain types of chemical processes, it is necessary to feed finely-divided solid materials to a liquid medium. Considerable difficulties are encountered in introducing finely-divided solids into such reaction systems, particularly where the reaction system must be sealed from the atmosphere.

An example of a system in which a solid material must be added to a liquid reaction system sealed from the atmosphere is the introduction of finely-divided solid catalysts into olefin polymerizations that are carried out in a liquid hydrocarbon medium. A common method for introducing such catalyst solids to the liquid polymerization medium is to suspend the catalyst solids in a hydrocarbon medium, feed such a suspension to a cup maintained in a rotatable valve, and then to rotate the valve to dump the catalyst solids into the reaction medium. A typical catalyst feeding system of this type is shown in U.S. Pat. No. 3,257,363. By feeding the catalyst solids to the reaction medium in this manner, the catalyst is added to the reaction medium in finite charges on a discontinuous basis. As a consequence, in most instances, the concentration of catalyst particles varies in different sections of the polymerization medium. In view of the problems of obtaining uniform dispersions of such finely-divided solids in a reaction medium, it would be desirable to have available to the art methods for feeding such finely-divided solids to a reaction system on a truly continuous and uniform basis.

SUMMARY OF THE INVENTION

The applicants have discovered that finely-divided solid polymerization catalysts can be introduced into an olefin polymerization zone on a truly continuous basis by pumping into the polymerization zone a Bingham fluid* which has the finely-divided solid polymerization catalyst uniformly dispersed throughout a continuous solid phase, which is a mixture of a wax and a liquid hydrocarbon.

*A Bingham fluid, sometimes referred to as a Bingham body, is a material which is a solid at a particular temperature under consideration, usually ambient temperature, but which will flow when subjected to an applied shearing stress which exceeds a minimum value characteristic of the system under consideration. For a description of the characteristics of Bingham fluids, see RHEOGLOGY by Frederick Eirich, Academic Press Inc., New York City, Library of Congress Catalog Card 56—11131, particularly Volume 3, pages 198-201.

BRIEF DESCRIPTION OF THE DRAWINGS

FIG. 1-A is a schematic representation of a uniform dispersion of solid catalyst particles in an olefin polymerization reactor obtained with the practice of the present invention.

FIG. 1-B is a schematic representation of the type of non-uniform dispersion of solid catalyst particles in an olefin polymerization reactor obtained with prior art practice in which the catalyst particles are charged to the reactor in finite charges on a discontinuous basis.

DETAILED DESCRIPTION OF THE INVENTION

Figure 1:
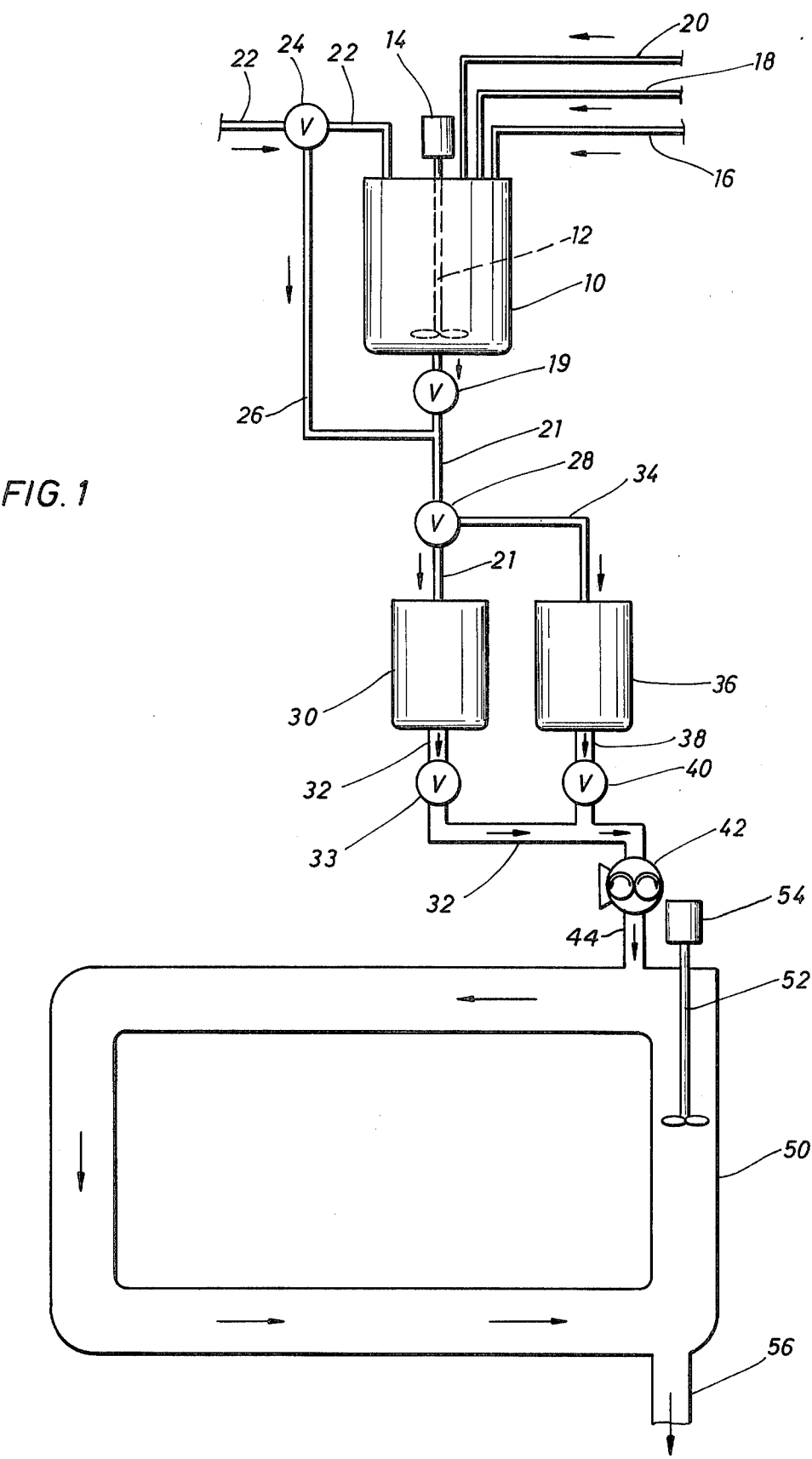
FIG. 1 is a schematic representation of apparatus which can be employed to carry out the process of the invention.
Figure 1A:
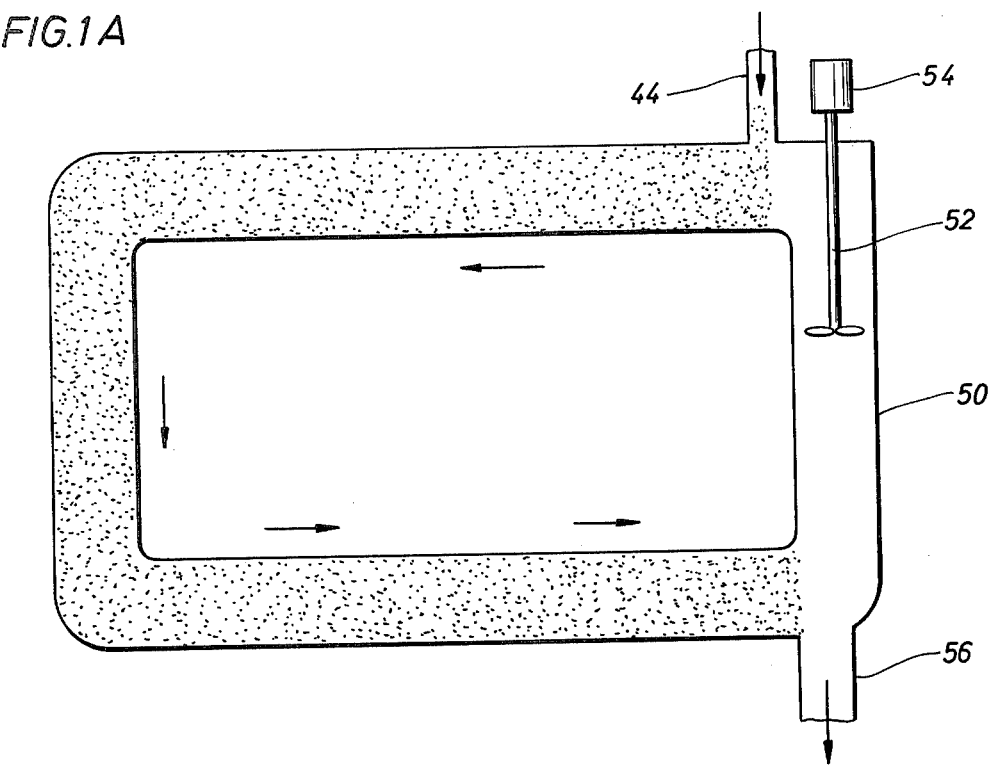
Figure 1B:
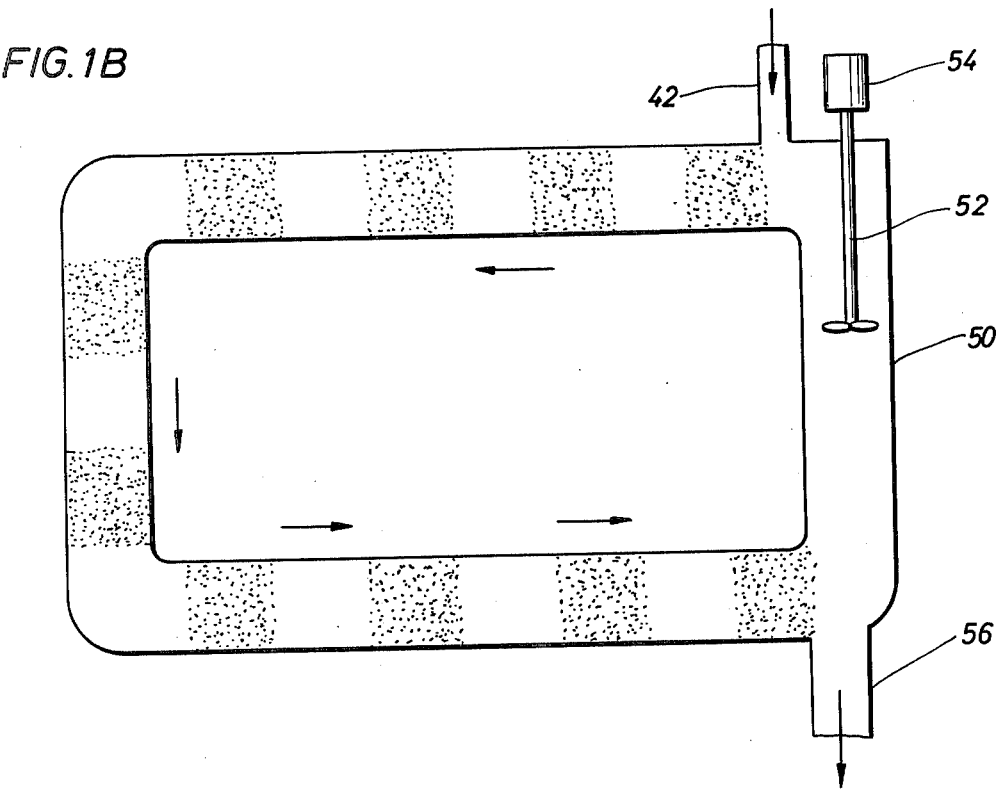

The continuous solid phase* of the Bingham fluid compositions of the invention consists of an intimate mixture of 100 parts by weight of a suitable wax and about 40–250 parts and preferably about 80–150 parts by weight of a liquid hydrocarbon. In special cases subsequently discussed, the wax and the liquid hydrocarbon can be employed in proportions outside of these ratios.

*The continuous solid phase customarily serves merely as a carrier for the functional material. In special cases subsequently described, one or both components of the continuous solid phase can play a functional role.

The continuous solid phase of the Bingham fluid compositions of the invention, in most instances, is not a true solid in a classical chemical and physical sense. Rather, it is a network of extremely finely-divided wax particles dispersed throughout the liquid hydrocarbon. In many instances the wax particles may be bonded to each other in a semi-crystalline lattice. In certain physical characteristics, the continuous solid phase resembles a gel. Regardless of its precise chemical and/or physical state, for the purpose of describing and claiming the invention, the wax-liquid hydrocarbon mixtures will be characterized simply as a "continuous solid phase."

The wax component included in the Bingham fluid compositions of the present invention can be any of the known waxes, provided that it meets each of the following criteria:

1. At least 30 parts of the wax will be dissolved in 100 parts of n-heptane at 80° C.
2. A solution prepared per (1) above, when cooled to 20° C., forms a continuous solid phase having the characteristics described earlier herein.
3. The continuous solid phase prepared per (2) above will flow when subjected to a shear stress of 50 sec$^{-1}$.

Suitable waxes are described in the *Kirk-Othmer Encyclopedia of Chemical Technology*, Interscience Publishers, New York City, Second Edition, Library of Congress Card 63—1438, Vol. 22, pages 156–173, which description is incorporated herein by reference. Such waxes include the (a) animal waxes, e.g., bees wax, spermaceti wax, Chinese insect wax and shellac wax; (b) vegetable waxes, e.g., carnauba wax, candelilla wax, hydrogenated castor oil, ouricury wax, Japan wax, and bayberry wax; (c) mineral waxes, e.g., peat wax, montan wax, ozocerite wax, and petroleum waxes; and (d) synthetic waxes such as low molecular weight polyethylenes (which frequently are partially oxidized) and oxidized hydrocarbon waxes prepared from Fischer-Tropsch paraffins. The animal and vegetable waxes, while complex mixtures, are principally esters of a long chain fatty alcohol and a long chain fatty acid, although certain of the natural waxes also contain significant quantities of monoglycerides of long chain fatty acids such as glyceryl monostearate.

The preferred waxes for use in Bingham fluid compositions that are stored and used at ambient temperature, i.e., about 10° to 40° C., are the hydrocarbon waxes such as the petroleum waxes. Such hydrocarbon waxes are preferred by reason of their chemical inertness and their commercial availability in large volume at modest cost.

The petroleum waxes employed can be any one of the three principal categories of the petroleum waxes more specifically a paraffin wax, an intermediate wax, or a microcrystalline wax. As is recognized in the art paraffin waxes are predominately normal paraffins, straight chain saturated hydrocarbons which may contain minor amounts of isoparaffins. The microcrystalline waxes are predominately cyclic saturated hydrocarbons (naphthenes) and isoparaffins. The intermediate waxes are blends or mixtures of paraffin and microcrystalline waxes. Table I below sets forth certain of the physical and chemical properties of these three classes of waxes.

TABLE I

|  | Paraffin | Intermediate | Microcrystalline |
|---|---|---|---|
| Melting Point Range, ASTM D127° F. | 120–160 | 130–160 | 130–180 |
| Molecular Weight Range | 340–400 | 360–550 | 500–600 |
| Density Range | 0.80–0.917 | 0.85–0.93 | 0.89–0.94 |
| Gravity ASTM D287 °API, 210° F. | 35–60 | 30–55 | 30–50 |
| Distillation, Vacuum Corrected to 760 mm Hg 5% point, ° F. | 750–810 | 825–900 | 950–1,050 |
| A typical paraffin was has the following properties: | | | |
| Gravity ASTM D287 °API | 41.3 | | |
| Melting point ASTM D87 ° F. | 140.1 | | |
| Congealing point ASTM D938 °F. | 138.0 | | |
| Penetration ASTM D1321 at 77°F. | 14.0 | | |
| at 100° F. | 40.0 | | |
| Flash point, °F. | 455.0 | | |
| Ultraviolet absorbitivity at 280 mµ ASTM D2008 | 0.01 | | |
| Iodine number | 0.4 | | |
| Molecular weight | 442.0 | | |
| Refractive index | 1.4359 | | |
| Distillation vacuum corrected to 760 mm. Hg 5% point, °F. | 804.0 | | |

It is known that certain of the petroleum waxes, depending upon their source, contain minor quantities of chemicals containing nitrogen, oxygen and/or sulfur atoms. Such minor components are difficult to remove. If such components are objectionable, as when a Ziegler-type polymerization catalyst is included in the Bingham fluid compositions, equivalent hydrocarbon waxes can be prepared by synthetic methods, as by hydrogenating synthetic higher mono-1-olefins, particularly the $C_{18}$ to $C_{30}$ monoolefins. Alternatively, such mono-1-olefins themselves can be employed as the wax.

The liquid hydrocarbon included in the compositions of the invention can be any of the comman hydrocarbons of either the aliphatic or aromatic type. It is preferred to employ relatively low boiling aliphatic hydrocarbons, particularly the pentanes, hexanes, heptanes, and octanes.

The wax and the liquid hydrocarbon, when heated to a temperature sufficiently high to melt the wax and subsequently cooled to ambient temperature provide thick mobile, single phase wax-like solids.* These blends, while solid at ambient temperature and pressure, flow readily under modest pressures of less than about 100 psig.

*Since the continuous phase consists of a mixture of two hydrocarbons, the transition between the solid state and the liquid state is not sharp. For the purpose of this invention, the continuous phase is considered to be a solid if it has the capability of holding finely-divided dispersed solids in suspension without significant settling for a period of 30 days at ambient temperature.

The precise physical characteristics of the wax-liquid hydrocarbon solid blends will depend somewhat upon the chemical type and the boiling point of the liquid hydrocarbon, and the chemical type and melting point of the wax employed. The ratio of the two components also has an effect upon the physical properties of the resultant blends. It has been observed, however, that by proper selection of the wax and the liquid hydrocarbon, and the proportions of the two components, it is possible to prepare compositions that are homogeneous at ambient temperature and will retain their single phase solid state over the normal range of ambient temperature encountered in the temperate zone, specifically from about 10° C. to about 40° C. Compositions of optimum properties are obtained when a hydrocarbon wax having a melting point in the range of about 60°–80° C. is blended with a $C_5$–$C_{10}$ aliphatic hydrocarbon, with about 80 to 150 parts of liquid hydrocarbon being employed per 100 parts of the hydrocarbon wax. In special cases, the inorganic catalyst dispersed in the continuous solid phase can have an effect on the physical properties of the continuous solid phase. This phenomenon will be discussed subsequently.

The continuous solid phases iof the Bingham fluids described above, by reason of being based on a hydrocarbon that is a liquid at ambient temperature, are solids at ambient temperature and atmospheric pressure. If the Bingham fluids are to be employed at subambient temperatures and/or stored at pressures above atmospheric, it is possible to employ in the continuous solid phase lower boiling hydrocarbons such as butane, butene-1, propane, propylene, or ethylene. These lower boiling hydrocarbons, for the limited purpose of the present invention, are considered to be liquid hydrocarbons.

It will be recognized, of course, that such systems must be maintained at temperatures and pressures below the critical point of the liquid hydrocarbon included in the Bingham fluid composition. The critical point for ethylene is 9.9° C. and 50.5 atmospheres. The use of ethylene as the liquid hydrocarbon is desirable where the Bingham fluid compositions are introduced into an ethylene polymerization reactor and it is desired to hold the introduction of extraneous compounds into the polymerization zone to an absolute minimum.

Where a Bingham fluid composition is employed containing a liquid hydrocarbon of the type described in the second paragraph above and is stored at a temperature below 10° C., it is feasible and usually desirable to employ as the wax an aliphatic hydrocarbon which is a liquid at the critical temperature of the liquid hydrocarbon, but which is a wax-like solid at the temperature at which the Bingham fluid is to be stored. $C_{15}$ or lower aliphatic hydrocarbon can be employed, with $C_{10}$ to $C_{15}$ aliphatic hydrocarbons being preferred. Mixtures of ethylene and dodecane or tetradecane can be used with advantage as the continuous solid phase of such Bingham fluid compositions.

To prepare Bingham fluid compositions for addition to propylene polymerization systems, propylene desirably may be employed as the liquid hydrocarbon component. The critical point for propylene is 91.9° C. and 45.4 atmospheres. Thus such Bingham fluid compositions can be stored at ambient temperature, but must be stored under a propylene pressure sufficiently high to maintain the propylene in the liquid state at the prevailing temperature.

The solids to be employed in the Bingham fluid compositions are finely-divided inorganic materials which catalyze the stereospecific polymerization of olefins such as ethylene, propylene, higher monoolefins such as hexene, conjugated diolefins such as butadiene, isoprene, and the like. One example of such inorganic polymerization catalysts consists of a chromium catalyst supported upon a silica or a silica-alumina support. The chromium catalyst may be present as chromia, or certain organochromium compounds such as dicyclopentadienyl chromium (II), and other similar organo-chromium compounds of the type disclosed in the following-issued U.S. Pat. Nos.: 3,157,712, 3,324,095, 3,324,101, 3,687,920, 3,709,853, 3,709,954, 3,756,998, 3,757,002, 3,806,500.

A second example of such inorganic polymerization catalysts consists of a molybdenum oxide catalyst carried upon an alumina support. A third example of such inorganic polymerization catalysts consists of the socalled Ziegler-type catalysts which are the reaction product of a salt of a transition metal of Group IV-B, V-B, or VI-B of the Periodic Table; and an organometallic compound of a metal of Group II-A, II-B, or III-A of the Periodic Table. The Periodic Table referred to is the same Periodic Table referred to in U.S. Pat. No. 3,219,648. The preferred examples of such catalysts are the reaction products of a titanium chloride and an aluminum alkyl. Desirably, such Ziegler-type catalysts may be deposited on an inert support to provide a large ratio of catalyst surface to catalyst weight. The Ziegler-type catalysts may be prepared in situ in the melted petroleum wax-liquid hydrocarbon blends as subsequently described. A detailed description of the above types of polymerization catalysts are set forth in the text *Crystalline Olefin Polymers-Part I* by R. A. V. Raff and K. W. Doak, Interscience Publishers, 1965, Library of Congress Catalog Card No. 64, 12191; which description is incorporated herein by reference.

The percentage of the finely-divided solids to be dispersed in the Bingham fluid compositions of the invention can be varied over a wide range and normally will be set to facilitate the incorporation of the appropriate quantity of the dispersed solid into the desired material by pumping of the Bingham fluid composition into the desired medium. Customarily, the finely-divided solids will be dispersed in the Bingham fluid compositions of the invention in the range of about 1–60 weight %, preferably about 1–40 weight %, and especially about 5–20 weight % of the total composition.

Where it is desired to add additional components to the polymerization system, such other components may be incorporated into the Bingham fluid together with the desired finely-divided catalyst solids. Among the additional materials that can be incorporated into the Bingham fluid compositions are comonomers such as mono-1-olefins that can contain as few as 2 carbon atoms (as when ethylene is included as a comonomer in the Bingham fluid composition employed to feed the catalyst to a propylene polymerization) to as many as 30 carbon atoms when such long chain mono-1-olefins are included in a Bingham fluid composition employed to feed the catalyst to an ethylene polymerization. More typical comonomers employed include butene-1 and hexene-1. Another example of a class of materials included in the Bingham fluid compositions are the organo silicones and flurosilicones such as dimethylsilicone, diphenylsilicone, and the like. These materials sometimes are injected into a particle form polymerization reaction zone to modify the size and/or shape of the polymer particles being produced.

In selected special cases where a comonomer is included in the Bingham fluid composition, such comonomer may serve as a partial or complete replacement for either the Wax or liquid hydrocarbon included in the continuous solid phase of the Bingham fluid composition. Thus a binary mixture of wax and a liquid mono-1-olefin such as hexene can be used as the continuous solid phase of a Bingham fluid composition. The hexene serves the dual function as the liquid hydrocarbon component of the continuous solid phase and as a comonomer. As earlier noted, higher mono-1-olefins such as $C_{20}$ to $C_{30}$ mono-1-olefins are waxes. For this reason, a binary mixture of a $C_{30}$ mono-1-olefin and hexane can be used as the continuous solid phase of a Bingham fluid composition. In this system, the higher mono-1-olefin serves the dual function as the wax of the continuous solid phase and as a comonomer.

Certain inorganic solids when employed in admixture with liquid hydrocarbons function as Bingham fluids. Examples of such materials include siliceous materials which contain hydroxyl groups which can be considered to be polymeric materials containing the grouping

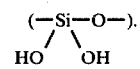

If such materials are employed as supports for the active catalyst, such supported catalysts can serve as a partial replacement for the wax in the Bingham fluid compositions.

A desirable characteristic of the Bingham fluid compositions employed in the invention is that they readily dissolve and/or disperse when they contact a liquid hydrocarbon. Thus, when the Bingham fluid composition containing the catalyst particles is pumped into a reactor in which an olefin is being polymerized in a liquid hydrocarbon medium, the solid continuous phase is dissolved or dispersed in a very short period of time and the suspended solids are dispersed in the liquid medium to aid in the polymerization of the olefin. The wax and the liquid hydrocarbon of the continuous solid phase are inert and have no adverse effect on the polymer system to which they are added. The liquid hydrocarbon component of the Bingham fluid is removed from the polymer product with the hydrocarbon medium in which the polymerization is carried out. The wax will be removed from the polymer product, if the polymer product subsequently is treated with solvents to remove catalyst fragments, or atactic polymer present in propylene polymers. With other types of polymerization systems, the wax remains in the polymer product and is either innocuous or has a beneficial effect on the polymer.

The Bingham fluid compositions containing a Ziegler-type polymerization catalyst as the dispersed solid phase are remarkably stable and not seriously deactivated by exposure to air and atmospheric moisture over extended periods of time. Thus, the rigorous exclusion of oxygen and atmospheric moisture is not as critical as in many prior art processes.

The Bingham fluid compositions employed in the invention preferably are prepared by heating the desired proportions of wax and the liquid hydrocarbon in a stirred vessel and adding the finely-divided solid particles thereto. This mixture is agitated with sufficient intensity to disperse the suspended solids uniformly throughout the melt, after which the entire composition is cooled until it solidifies.

The solidified mixture then is transferred to a suitable storage vessel. The compositions can be prepared in apparatus of the type illustrated in FIG. 1.

The apparatus illustrated in FIG. 1 contains a reactor 10 provided with a stirrer 12 driven by a motor 14. The reactor 10 is constructed so that it can operate under an applied pressure of at least about 100 psig. Lines 16, 18, and 20 are provided to feed to the reactor, respectively, a liquid hydrocarbon, a wax, and a finely-divided solid which is to be the dispersed solid phase in the final Bingham fluid composition. A gas line 22 fitted with a two-way valve 24 is provided so that the reactor 10 can be pressurized to discharge the Bingham fluid composition from reactor 10 via outlet line 21, which contains a valve 19. Line 21 is connected to storage vessel 30. A two-way valve 28 is provided in line 21 so that the Bingham fluid composition from reactor 10 also can be fed through line 34 to a second storage vessel 36 which is maintained in parallel with storage vessel 30. A transfer line 32 equipped with a valve 33 is provided in storage tank 30 so that the Bingham fluid composition contained therein can be transferred therefrom by means of gear pump 42. In a like manner, an outlet line 38 equipped with a valve 40 is provided in storage tank 36 for feeding the Bingham fluid composition through line 32 to gear pump 42.

In the preparation of the Bingham fluid composition, a melted wax is introduced into reactor 10 through line 16. Liquid hydrocarbon is fed to reactor 10 through line 18. The wax and the liquid hydrocarbon are maintained at a temperature sufficiently high to keep the mixture liquid and is stirred to provide a homogeneous liquid phase. The desired solids then are fed to reactor 10 via line 20. Stirring is continued to thoroughly disperse the solids in the continuous liquid phase. The contents of the reactor 10 then are cooled to the point at which the total composition is just above the gel point. The lines 16, 18, and 20 then are sealed by suitable valves not shown and the reactor is pressurized by an inert gas introduced into the reactor via line 22. Valves 19 and 28 are opened and the Bingham fluid composition in reactor 10 is transferred via line 21 to storage tank 30.

To assure that an adequate supply of Bingham fluid composition is available at all times, the operations above-described are repeated with the exception that valve 28 is turned so that the Bingham fluid composition prepared in reactor 10 is transferred to the second storage tank 36.

With the storage tanks 30 and 36 filled with the desired Bingham fluid composition, the apparatus is in a condition to feed the Bingham fluid composition to polymerization reactor 50. Valve 19 is closed and valves 24 and 28 are set so that gas from line 22 is fed through line 26 into line 21 so as to apply a pressure on the contents of storage tank 30. The pressure applied on storage tank 30 converts the Bingham fluid composition to the liquid phase and forces the composition through line 32 and valve 33 to gear pump 42 which feeds the composition through line 44 to reactor 50. Reactor 50 is a loop reactor equipped with a stirrer 52 driven by motor 54. A hydrocarbon diluent such as isobutane and ethylene or another olefin is fed to the reactor on a continuous basis through lines not shown. The reaction temperature and pressure are controlled by techniques known in the art and not shown. Polymer product is continuously withdrawn through line 56.

After storage tank 30 has been emptied, valve 28 is turned so that the gas pressure introduced through line 22 is fed through line 34 to pressurize storage tank 36 which feeds its contents to gear pump 42. After storage tank 30 is emptied and storage tank 36 is being emptied, additional Bingham fluid composition is prepared in reactor 10 and is transferred to refill storage tank 30.

To prepare Bingham fluid compositions containing normally gaseous hydrocarbon such as ethylene as the liquid hydrocarbon component of the Bingham fluid compositions, it is necessary to operate at reduced temperatures and elevated pressures. The reactor 10 is charged with a hydrocarbon such as tetradecane (which will function as the wax) and the solid catalyst particles. The mixture is well stirred and ethylene is admitted to reactor 10 at a pressure well in excess of 50.5 atmospheres. Reactor 10 then is cooled to a temperature well below 9.9° C. to liquify the ethylene. As the composition in reactor 10 is about to solidify, valves 19 and 28 are opened to transfer the Bingham fluid composition to storage vessel 30 which will be maintained well below 9.9° C. Valve 19 then is closed and valves 24 and 28 are adjusted so that storage vessel 30 is maintained under an ethylene pressure in excess of 50.5 atmospheres. When valve 33 is opened, the Bingham fluid composition will flow through line 32 to gear pump 42. Line 32, valve 33, and gear pump 42 will be maintained at a temperature below 9.9° C.

As the Bingham composition is fed to reactor 50 on a continuous basis and the wax-hydrocarbon solid phase dissolves and/or disperses in the hydrocarbon medium virtually instantaneously, the solid catalysts are distributed uniformly throughout the polymerization medium. This type of catalyst dispersion is shown in FIG. 1-A in which the small dots represent catalyst particles. FIG. 1-B represents the type of distribution of catalyst particles achieved in prior art processes in which a catalyst slurry is charged to the reactor in finite charges on a discontinuous basis.

The following examples are set forth to illustrate more clearly the principle and practice of this invention to those skilled in the art. When parts and percentages are mentioned, they are parts and percentages by weight unless otherwise specifically noted.

EXAMPLE 1

Part A

A paraffin wax* having a melting point of 54°–56° C., in the amount of 716 gms, was melted and charged to reactor 10 which had a 3-liter capacity. The melted wax was cooled to a temperature of about 65° C. and 740 ml of a 20 weight % solution of triethyl aluminum in n-heptane was charged to the reactor. The contents of the reactor were cooled to about 55° C. and 109 gms of particulate aluminum-reduced titanium trichloride was charged to the reactor. Stirring was continued until the temperature was reduced to 40° C., at which point incipient solidification of the composition began to take place. Valves 19 and 28 were opened and a nitrogen pressure of 50 psig was introduced into reactor 10 by line 22 to transfer the contents of reactor 10 to storage tank 30.

*The wax was a synthetic paraffin prepared by hydrogenating a mixture of synthesized mono-1-olefins containing about 30 carbon atoms.

Part B

The Bingham fluid composition of Part A was employed as the catalyst to prepare polyethylene in a stirred particle form loop reactor. The polymerization reactor was run continuously with heptane being charged to the reactor at a rate of 320 lbs/hr. and ethylene being charged to the reactor at a rate of 30 lbs/hr. The polymerization was carried out at a temperature of about 90° C. and at a pressure of about 450 psig. The Bingham fluid composition of Part A was continuously introduced into the reactor via gear pump 42 at a rate of approximately 30 ml/hr. to feed the reactor the equivalent of about 1.4 gm. of the active catalyst per hour. Over a three-hour period, approximately 80 lbs. of polyethylene was produced, with polymer being produced as a rate of about 8950 lbs. of polyethylene/lb. of catalyst.

EXAMPLE 2

A charge of approximately 900 gms. of the same melted wax employed in Example 1, Part A, was made to reactor 10. A charge of approximately 500 ml of n-heptane then was fed to the reactor. There was then fed to the reactor 50 parts of an activated commercial chromia on silica catalyst slurried in 209 parts of n-heptane. The mixture was stirred continuously and cooled to approximately 40° C., at which point incipient solidification of the composition began to take place. The Bingham fluid composition then was transferred to storage tank 30 as previously described in Example 1, Part A.

EXAMPLE 3

Another Bingham fluid composition was prepared in the same manner as described in Example 2, except that the solid introduced into the reactor was a bis (cyclopentadienyl) chromium (II) supported upon a silica support. This catalyst was prepared as described in U.S. Pat. No. 3,709,853.

EXAMPLES 4 AND 5

Polyethylene was prepared with each of the Bingham fluid compositions prepared in Examples 2 and 3 employing polymerization conditions essentially similar to those set forth in Example I, Part B. Good quality polymer was obtained in each run.

What is claimed is:

1. In a continuous process for the polymerization of a polymerizable olefin in a liquid hydrocarbon medium in which olefin monomer is continuously added to the polymerization zone, finely-divided solid polymerization catalyst is added to the polymerization zone, and the polymerization product is continuously withdrawn from the reaction zone; the improvement which consists essentially of feeding the polymerization catalyst to the reaction zone on a continuous basis by pumping a Bingham fluid composition into the reaction zone, said Bingham fluid composition being a solid at ambient temperature and consisting essentially of a finely-divided solid polymerization catalyst uniformly dispersed in a continuous solid phase which consists essentially of an intimate mixture of a wax and a liquid hydrocarbon.

2. A process of claim 1 in which the continuous solid phase of the Bingham fluid composition consists essentially of 100 parts by weight of the wax and about 40 to about 250 parts by weight of the liquid hydrocarbon.

3. A process of claim 1 in which the polymerizable olefin is selected from the group consisting of ethylene and propylene.

4. A process of claim 2 in which the polymerizable olefin is selected from the group consisting of ethylene and propylene.

5. A process of claim 1 in which the polymerizable olefin is propylene and the continuous solid phase of the Bingham fluid composition consists essentially of an intimate mixture of a hydrocarbon wax and propylene.

6. A process of claim 1, 2, 3, or 4 in which the solid polymerization catalyst is a chromium compound.

7. A process of claim 1, 2, 3, 4 or 5 in which the solid polymerization catalyst is the reaction product of a salt of a transition metal of Group IV-B, V-B, or VI-B of Periodic Table and an organometallic compound of a metal of Group II-A, II-B, or III-A of the Periodic Table.

8. A process of claim 1, 2, 3, 4 or 5 in which the solid polymerization catalyst is the reaction product of a titanium chloride and an aluminum alkyl.

9. In a continuous process for the polymerization of ethylene in a liquid hydrocarbon medium in which ethylene is continuously added to the polymerization zone, finely-divided solid polymerization catalyst is added to the polymerization zone, and the polymerization product is continuously withdrawn from the reaction zone; the improvement which consists essentially of feeding the polymerization catalyst to the reaction zone on a continuous basis by pumping a Bingham fluid composition into the reaction zone, said Bingham fluid composition being a solid at subambient temperature and consisting essentially of a finely-divided solid polymerization catalyst uniformly dispersed in a continuous solid phase which consists essentially of an intimate mixture of a $C_{10}$ to $C_{15}$ aliphatic hydrocarbon and ethylene.

* * * * *